United States Patent
Kasperkovitz

(10) Patent No.: US 8,350,746 B2
(45) Date of Patent: Jan. 8, 2013

(54) ANTI JAMMING SYSTEM

(75) Inventor: Wolfdietrich Georg Kasperkovitz, Waalre (NL)

(73) Assignee: Semiconductor Ideas to the Market (ITOM) B.V., AH Breda (NL)

( * ) Notice: Subject to any disclaimer, the term of this patent is extended or adjusted under 35 U.S.C. 154(b) by 347 days.

(21) Appl. No.: 12/682,251

(22) PCT Filed: Oct. 10, 2008

(86) PCT No.: PCT/EP2008/008549
§ 371 (c)(1),
(2), (4) Date: Jul. 8, 2010

(87) PCT Pub. No.: WO2009/046986
PCT Pub. Date: Apr. 16, 2009

(65) Prior Publication Data
US 2010/0283658 A1    Nov. 11, 2010

(30) Foreign Application Priority Data
Oct. 10, 2007 (EP) .................................. 07019800

(51) Int. Cl.
*G01S 7/36* (2006.01)

(52) U.S. Cl. .................. 342/16; 342/18; 342/19; 342/21

(58) Field of Classification Search .............. 342/13–19, 342/21, 159
See application file for complete search history.

(56) References Cited

U.S. PATENT DOCUMENTS

| | | | | |
|---|---|---|---|---|
| 5,539,407 A * | 7/1996 | Scholz | ............................. | 342/17 |
| 5,790,067 A * | 8/1998 | Van Ommeren et al. | ....... | 342/17 |
| 6,268,821 B1 * | 7/2001 | Shrader et al. | ................... | 342/17 |
| 6,313,782 B1 * | 11/2001 | Lehan et al. | ..................... | 342/16 |
| 6,961,017 B1 * | 11/2005 | Naylor et al. | ............. | 342/357.29 |
| 2009/0128403 A1 * | 5/2009 | Bryant et al. | ............. | 342/357.02 |
| 2010/0265116 A1 * | 10/2010 | Kasperkovitz et al. | ......... | 342/16 |
| 2010/0283658 A1 * | 11/2010 | Kasperkovitz | ................... | 342/16 |
| 2011/0102258 A1 * | 5/2011 | Underbrink et al. | ..... | 342/357.47 |

FOREIGN PATENT DOCUMENTS

EP    2048775 A1 *    4/2009

OTHER PUBLICATIONS

Grant, P.M.; Collins, J.H.; , "Introduction to electronic warfare," Communications, Radar and Signal Processing, IEE Proceedings F , vol. 129, No. 3, pp. 113-132, Jun. 1982.*
Schuerger, J.; Garmatyuk, D.; , "Deception jamming modeling in radar sensor networks," Military Communications Conference, 2008. MILCOM 2008. IEEE , vol., No., pp. 1-7, Nov. 16-19, 2008.*
Blair, W.D.; Watson, G.A.; Kirubarajan, T.; Bar-Shalom, Y.; , "Benchmark for radar allocation and tracking in ECM," Aerospace and Electronic Systems, IEEE Transactions on , vol. 34, No. 4, pp. 1097-1114, Oct. 1998.*

* cited by examiner

*Primary Examiner* — John B Sotomayor
(74) *Attorney, Agent, or Firm* — Robert M. McDermott, Esq.

(57) ABSTRACT

Anti jamming system comprising a tunable negative jamming signal feedback loop for feedback suppression of a received jamming signal, including a receiver receiving an jamming signal followed by a jamming signal replica generator for generating an replica jamming signal. The receiver comprising a zero IF PLL jamming signal receiver having a synchronous demodulator and a phase detector, signal inputs thereof being coupled to said input means and carrier inputs coupled to in-phase and phase quadrature oscillator outputs, respectively, of a local voltage controlled oscillator (VCO), said VCO receiving a tuning control signal for tuning the zero IF PLL jamming signal receiver at the carrier frequency of the jamming signal. The VCO is included in a phase locked loop (PLL) comprising subsequent to the VCO, said phase detector and a loop filter. The replica jamming signal generator includes a tracking modulator with a baseband signal input coupled to an output of said synchronous demodulator and a carrier input coupled to the in-phase oscillator output of the VCO, an output of said modulator being negatively fedback to the input of the receiver.

19 Claims, 6 Drawing Sheets

ANTI JAMMING SYSTEM

Figure 1:
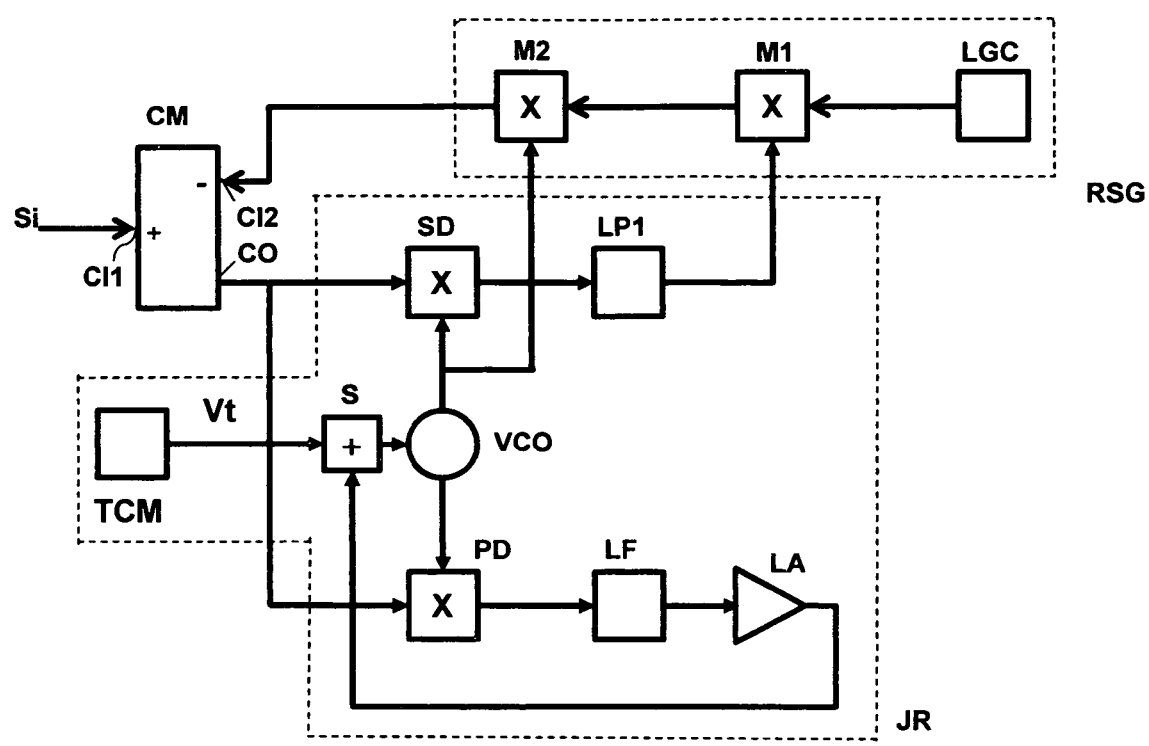

The invention relates to an anti jamming system with improved anti jamming techniques and, more specifically, to a technique for improved suppression of (suppressed) carrier modulated jamming signals, such as occurring in e.g. RF broadcast radio and TV systems, spread spectrum transmission systems, such as the Global Positioning System (GPS) and/or communication systems, such as GSM and CDMA and/or radar systems.

An anti jamming system for improved anti jamming of wideband radar systems is known, e.g. from UK Patent Application GB 2 215 565. This known anti jamming system is applied in a superheterodyne RF receiver using in an intermediate frequency (IF) signal path thereof an IF notch filter per each jamming signal. Suppression of an incoming first jamming signal is obtained by a first frequency conversion of said first jamming signal such, that the resulting first IF jamming signal coincides with the center frequency of a first IF notch filter.

In a subsequent mixer stage, a second frequency conversion is provided which in addition to the preceding first frequency causes an incoming second jamming signal to coincide with the center frequency of a second notch filter, etc.

The concept of the known anti jamming system is highly demanding with regard to the accuracy and performance of the circuitry needed, such as e.g. the stability of the notch filters and oscillators. Apart therefrom, each notch filter in the signal path reduces the overall signal to noise ratio of the receiver as a whole, which in practice limits the number of jamming signals which can be suppressed.

In consequence, amongst other things, it is an object of the present invention to provide a universal anti jamming system which can be used for a highly selective suppression of jamming signals in any frequency range and in a much wider field of application than the conventional anti jamming system, including RF broadcast radio and TV systems, spread spectrum transmission systems, such as the Global Positioning System (GPS) and/or communication systems, such as GSM and CDMA and/or radar systems.

Another object of the invention is to improve the performance in the suppression of jamming signals in terms of selectivity, robustness and rate of suppression.

Now therefore, an anti jamming system according to the invention comprising signal combining means having a first input receiving an input signal including a carrier modulated jamming signal is characterized by a negative jamming signal feedback loop for feedback suppression of said jamming signal from an output of said signal combining means to a second input thereof, said feedback loop including a zero IF PLL jamming signal receiver followed by a jamming signal replica generator for generating a replica jamming signal, said zero IF PLL jamming signal receiver comprising a synchronous demodulator and a phase detector, signal inputs thereof being coupled to the output of said signal combining means and carrier inputs coupled to in-phase and phase quadrature oscillator outputs, respectively, of a local voltage controlled oscillator (VCO), said VCO receiving a tuning control signal for tuning the zero IF PLL jamming signal receiver at a carrier frequency of the jamming signal, and being included in a phase locked loop (PLL), said PLL further comprising subsequent to the VCO, said phase detector and a loop filter, said replica jamming signal generator including a modulator having a baseband signal input coupled to an output of said synchronous demodulator and a local carrier input coupled to the in-phase oscillator output of the VCO, an output of said modulator being negatively feedback to the second input of the signal combining means.

The invention is based on the recognition that a narrowband selection of an incoming jamming signal can be obtained by using a zero IF PLL jamming signal receiver being tuned to receive said jamming signal, followed by a replica jamming signal generator. Such zero IF receiver not only demodulates the incoming jamming signal into its base band component or envelope signal thus allowing for a narrowband baseband selection thereof, it also preserves the exact carrier frequency and phase of the jamming signal. With these preserved signal components a replica jamming signal can be generated, which accurately corresponds to the original jamming signal.

According to the invention, the suppression of the jamming signal received at the signal combining means of the anti jamming system is obtained by including the zero IF PLL jamming signal receiver and the replica jamming signal generator in a negative jamming signal feedback loop having input and outputs coupled to said signal combining means. To obtain an effective reduction of the incoming jamming signal, the phase and gain requirements of the loop are easy to comply with in that the open loop gain of the jamming signal in the feedback loop only has to be sufficiently large, whereas the loop only has to reverse the signal phase, i.e. effectuate a 180° phase shift, of the jamming signal compared to the phase of the incoming jamming signal. This allows for a robust implementation of the anti jamming system.

An embodiment of a anti jamming system according to the invention is characterized by said signal combining means comprising an adder for mutually adding the carrier modulated jamming signal within the input signal supplied to the first input of the signal combining means and the phase reversed replica jamming supplied by the signal jamming signal replica generator to the second input of the signal combining means, providing a feedback suppression of the carrier modulated jamming signal within the input signal, said input signal with suppressed carrier modulated jamming signal being supplied to the output of the signal combining means.

This measure allows for a simple, cost effective implementation of the signal combining means in which the signal combining means provides the function of a summer or adder, if the replica jamming signal provided by the replica jamming signal generator is phase reversed with respect to the incoming jamming signal, or alternatively of a difference or subtracting circuit, if the replica jamming signal provided by the replica jamming signal generator is in phase with the incoming jamming signal.

An embodiment of a anti jamming system according to the invention is characterized in that the PLL includes a multiplier with first and second inputs coupled to outputs of the loop filter and the synchronous demodulator, respectively, for phase reversing the phase control signal in the PLL at zero crossings of the envelope signal of the jamming signal, an output of said multiplier being coupled to the VCO.

With this measure a zero IF Costas receiver is obtained, in which the occurrence of phase jump variations of the local VCO at zero crossings of the carrier of an incoming jamming signal is avoided.

An embodiment of an anti jamming system according to the invention is characterized by a first low pass filter coupled between the synchronous demodulator on the one hand and the modulator on the other hand.

This measure allows for a proper selection of the envelope signal of the jamming signal to be used in the generation of the replica jamming signal. Said first low pass filter may alternatively be implemented as integrator.

An embodiment of an anti jamming system according to the invention is characterized by a second low pass filter coupled between the synchronous demodulator on the one hand and the multiplier on the other hand.

This measure introduces an extra degree of freedom allowing to optimize the selection of the envelope signal of the jamming signal at the output of the synchronous demodulator independent from optimization of the functioning of the PLL, e.g. to further improve the suppression of more in particular vestigial sideband or single sideband signals.

For an adequate suppression of the incoming jamming signal with the replica jamming signal at the input means of the anti jamming system, the negative jamming signal feedback loop includes amplification means providing an open loop gain which is substantially larger than unity.

An embodiment of an anti jamming system according to the invention is characterized by a tuning control signal generator deriving said tuning control signal from predetermined tuning data defining the carrier frequency of a jamming signal.

This measure is applicable when the carrier frequency of the jamming signal to be suppressed is known. This may occur e.g. with RF broadcast radio or TV receivers located in the vicinity of Bluetooth transceivers or WiFi base stations, transmitting carrier signals at fixed frequencies and jamming RF radio and/or TV stations.

The invention is applicable to a plurality of frequency separated jamming signals by using a plurality of negative jamming signal feedback loops including said negative jamming signal feedback loop, said feedback loops being tuned to the mutually different carrier frequencies of said jamming signals.

To suppress jamming signals having unknown carrier frequencies, the invention is characterized by search tuning system using a microprocessor executing per each negative jamming signal feedback loop the steps of:
  deactivating the negative jamming feedback suppression;
  scanning the RF frequency band to detect carrier frequencies of jamming signals exceeding above a predetermined threshold value;
  storing the detected carrier frequencies;
  upon completion of the scanning operation, selecting the carrier frequency of the strongest jamming signal frequency not coinciding with the RF frequency of a wanted signal;
  supplying a tuning control signal to the VCO to tune the zero IF PLL jamming signal receiver at the carrier of the so selected jamming signal;
  activating the negative jamming feedback suppression.

The invention also relates to an RF receiver including such anti jamming system.

An RF receiver according to the invention is characterized by said anti jamming system being included in an RF signal path, or alternatively, in an IF signal path of the RF receiver.

The above and other object features and advantages of the present invention will be discussed in more detail hereinafter with reference to the disclosure of preferred embodiments wherein like or similar elements are designated by the same reference numeral through the several views, and in particular with reference to the appended Figures, that show in:

FIG. 1 a block diagram of a first embodiment of an anti jamming system according to the invention using a zero IF PLL jamming signal receiver.

Figure 2A:
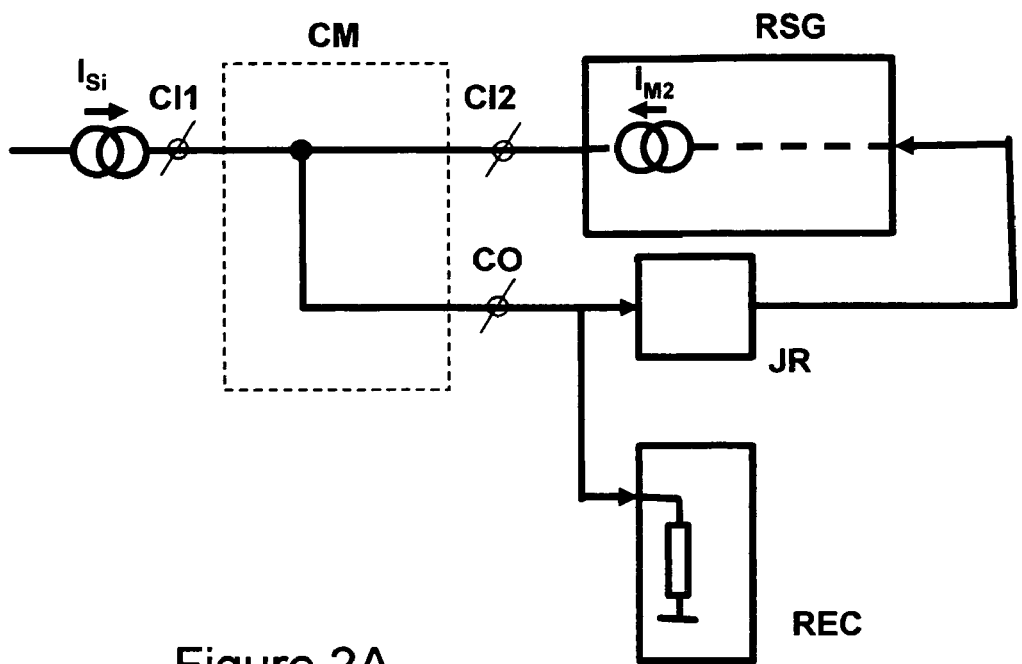

FIG. 2A a schematic diagram of a node implementation of the signal combining means for use in an anti jamming system according to the invention.

Figure 2B:
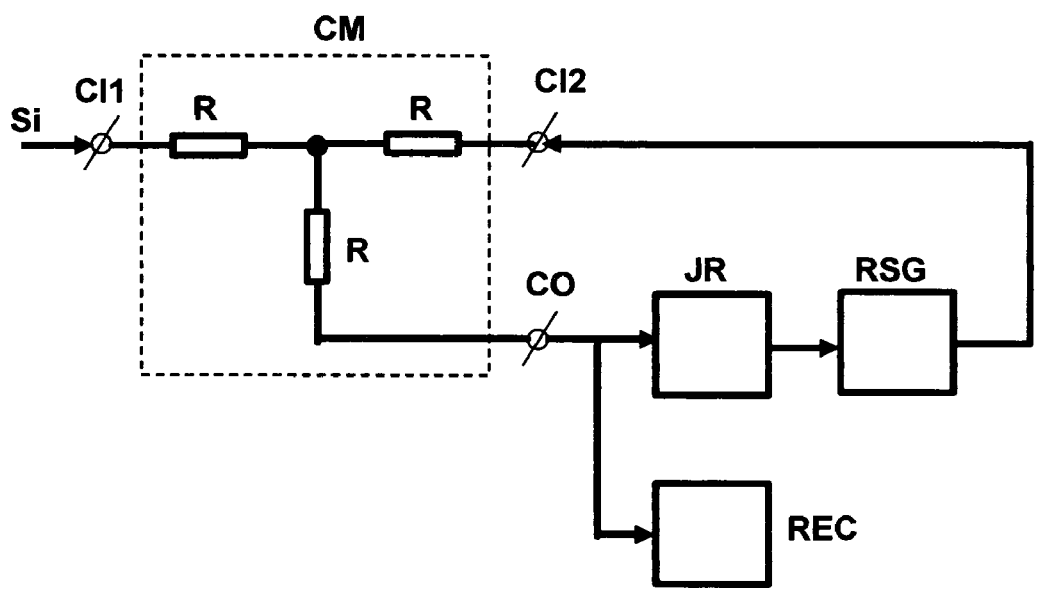

FIG. 2B a schematic diagram of an implementation of a signal combining means by means of an adder for use in an anti jamming system according to the invention.

Figure 3:
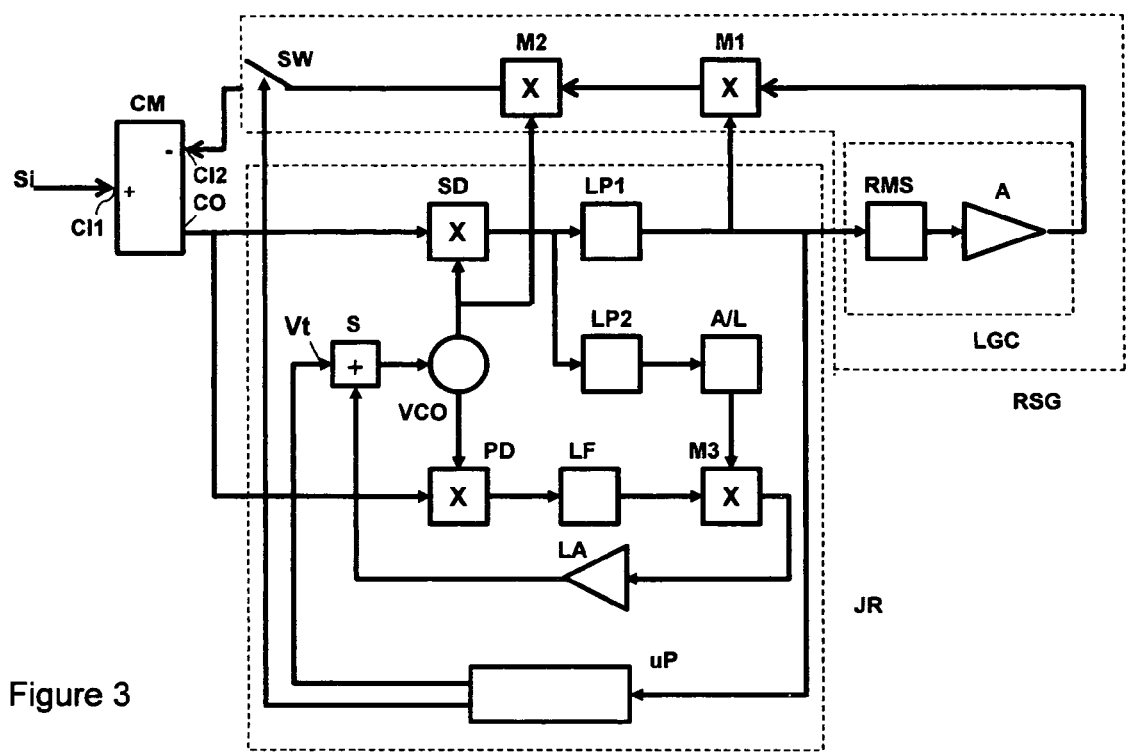

FIG. 3 a block diagram of an embodiment of an anti jamming system according to the invention using a zero IF Costas receiver with automatic search tuning at the carrier frequency of a jamming signal and loop gain control.

Figure 4:
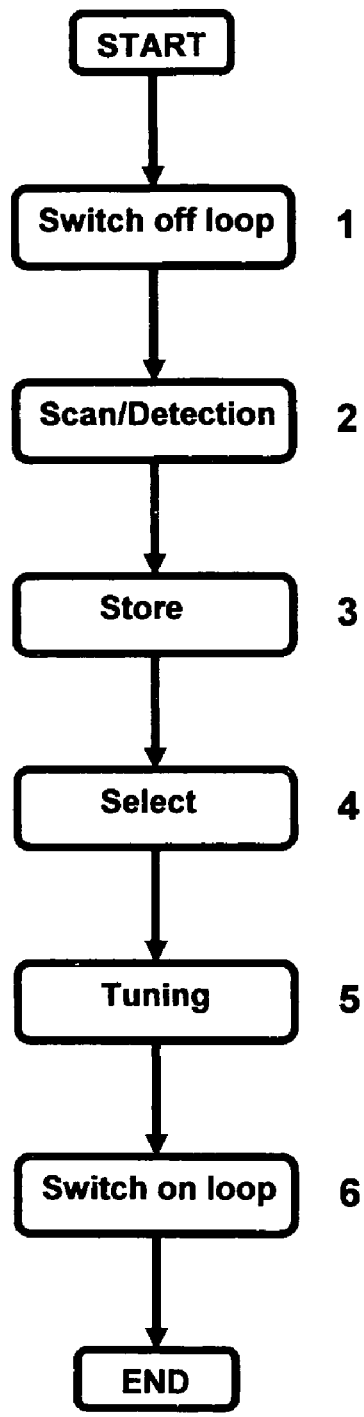

FIG. 4 a flow chart illustrating the steps executed by a microprocessor for automatic jamming signal search tuning in an anti jamming system according to the invention.

Figure 5:
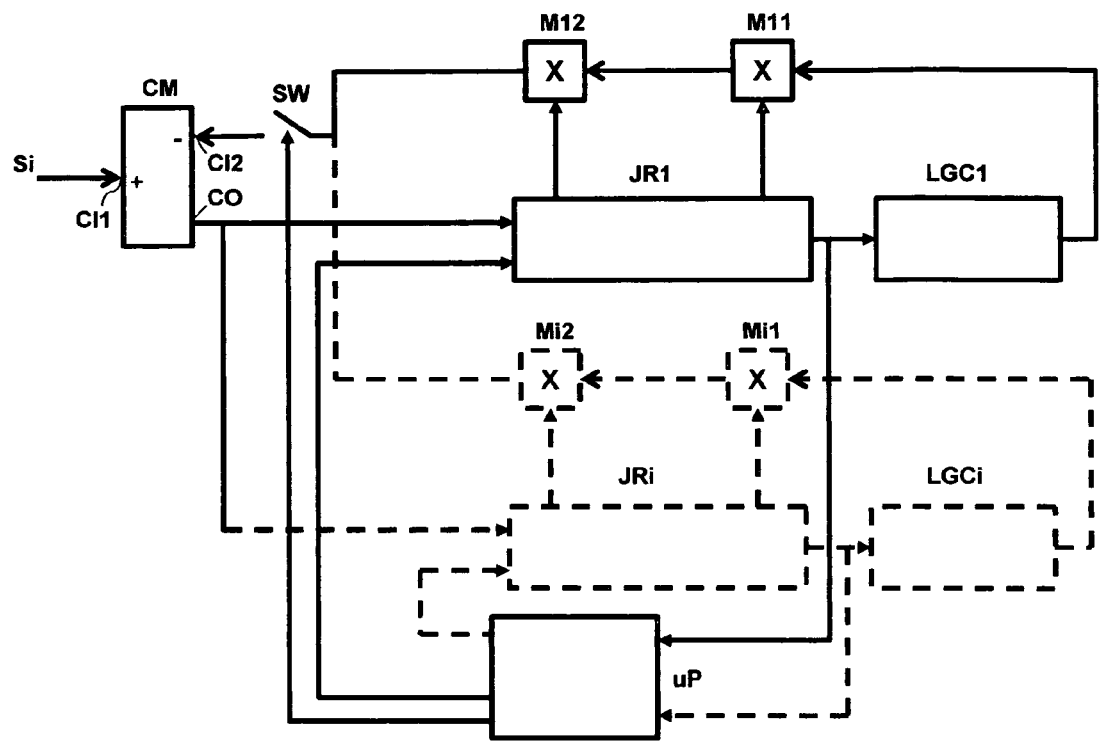

FIG. 5 a block diagram of an anti jamming system according to the invention for suppressing a plurality of jamming signals.

Figure 6A:
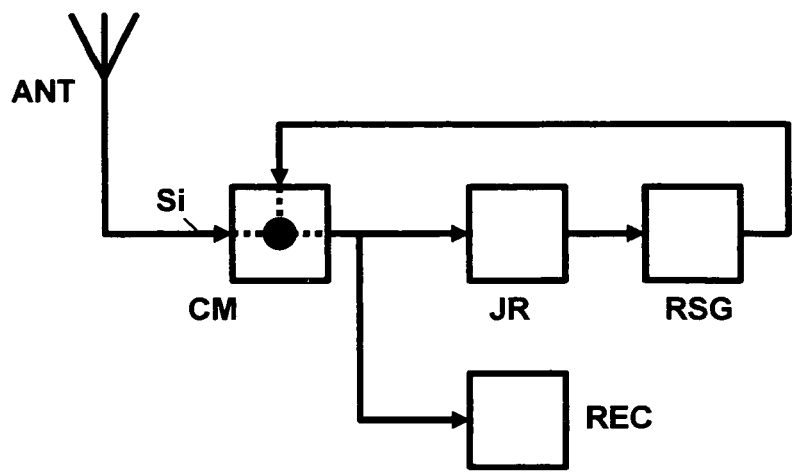

FIG. 6A a block diagram of an RF receiver using an anti jamming system according to the invention in the RF signal path.

Figure 6B:
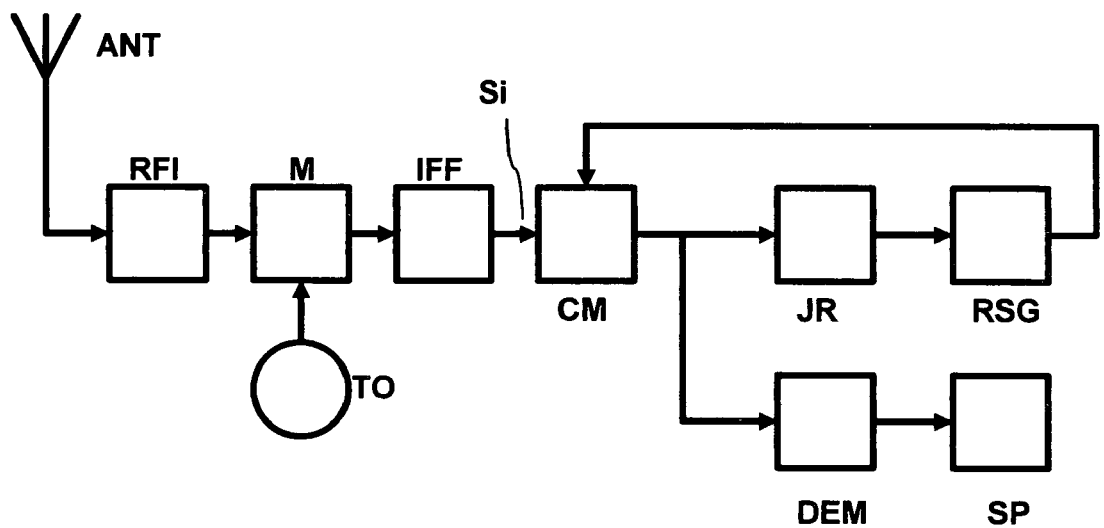

FIG. 6B a block diagram of an RF receiver using an anti jamming system according to the invention in the IF signal path.

FIG. 1 shows an anti jamming system having signal combining means CM, receiving at a first input CI1 an input signal Si including a jamming signal. An output CO of the signal combining means CM is coupled to a jamming signal receiver JR for receiving said jamming signal followed by a jamming signal replica generator RSG for generating a replica jamming signal. An output of the jamming signal replica generator RSG is negatively coupled to a second input of the signal combining means CM and forms therewith a negative jamming signal feedback loop for feedback suppression of said jamming signal from the output CO of the signal combining means CM back to the second input thereof. This results in a feedback suppression of a received jamming signal in the signal combining means CM, which increases with the open loop gain as provided by the jamming signal receiver JR and the jamming signal replica generator RSG, preventing strong jamming signals from occurring at the output CO of the signal combining means CM. The signal combining means CM may function as a summer, if the replica jamming signal provided by the replica jamming signal generator RSG is phase reversed with respect to the incoming jamming signal, or alternatively as a difference or subtracting circuit, if the replica jamming signal provided by the replica jamming signal generator is in phase with the incoming jamming signal.

The jamming signal receiver RF comprises a zero IF PLL jamming signal receiver having a synchronous demodulator SD and a phase detector PD, signal inputs thereof being coupled the output CO of the signal combining means CM and carrier inputs thereof being coupled to in-phase and phase quadrature oscillator outputs, respectively, of a local voltage controlled oscillator (VCO). The VCO is included in a phase locked loop (PLL) comprising subsequent to the VCO, said phase detector PD, a loop filter LF and a loop amplifier LA. The VCO receives a tuning control signal Vt from a tuning control signal generator TCM through a summer S. The tuning control signal generator TCM is provided with storage means, in which tuning data of known fixed jamming signals are stored and generates the above tuning control signal Vt from these tuning data for tuning the zero IF PLL jamming signal receiver at, or within the capture range of the PLL from, a known jamming signal. Such known jamming signals are e.g. carrier frequencies of Bluetooth and/or WiFi base station transmitting signals, radar and/or GPS signals.

In the summer S, this tuning signal Vt is added to the output signal of the phase detector PD of the PLL to form a phase/ frequency control signal for the VCO. With a properly chosen gain of the loop amplifier LA and bandwidth of the loop filter LF, an adequate negative feedback of phase errors in the PLL is obtained, causing the local phase quadrature VCO signal to be accurately in phase quadrature with the carrier of the jamming signal. As a consequence, the local in-phase VCO signal corresponds accurately in frequency and phase with the carrier of the incoming jamming signal allowing the synchronous demodulator SD to directly demodulate the jamming signal into baseband. The so obtained envelope signal of the jamming signal is being supplied from the output of the synchronous demodulator SD through a first low pass filter LP1 to a variable amplifier M1, which is part of the jamming signal replica generator RSG. The first low pass filter LP1 may be implemented as an integrator. The variable amplifier M1 may be implemented by a multiplier and is controlled by a gain control signal from a loop gain control signal generator LGC determining the gain of the tunable negative jamming signal feedback loop JR, RSG from the output CO of the signal combining means CM to its second input CI2. The gain of the variable amplifier M1 is chosen sufficiently large to obtain an effective suppression of the jamming signal in the signal combining means CM. In practice the open loop gain should be substantially larger than unity.

The jamming signal replica generator RSG further comprises a synchronous modulator M2 receiving at first and second inputs the amplified envelope signal from the variable amplifier M1 and the local in-phase VCO signal from the in-phase oscillator output of the VCO. As the local in-phase VCO signal is accurately phase locked to the carrier frequency of the incoming jamming signal, the synchronous modulator M2 accurately regenerates said jamming signal providing at an output thereof a replica of the incoming jamming signal, with a magnitude, which in closed loop operation is closely identical to that of the incoming jamming signal and which in open loop operation is strongly amplified with respect to the incoming jamming signal. By the negative feedback loop operation, a strong suppression of the incoming jamming signal in the signal combining means CM is obtained.

The signal combining means CM as shown in FIG. 1 may be implemented by an adder also referred to as summer, or by a subtractor, dependent on the phase of the replica jamming signal as provided by the jamming signal replica generator RSG. However, if both the replica jamming signal and the incoming jamming signal are current signals, a simple common node as shown in FIG. 2A could provide the function of said signal combining means CM. In this common node, first and second inputs CI1 and CI2 and output CO of the signal combining means CM coincide. In such node implementation of the signal combining means CM the node constitutes input and output of the jamming signal suppression system as well as input and output of the negative jamming signal feedback loop JR, RSG, at which the suppression of the incoming jamming signal is occurring. A receiver REC being coupled to the common node receives the input signal with only a strongly suppressed carrier modulated jamming signal. For a proper impedance matching the input impedance of the jamming receiver JR should be relatively high ohmic, whereas the input impedance of the receiver REC should be low ohmic, e.g. 50Ω.

FIG. 2B shows an implementation of the signal combining means CM by means of a voltage signal adder, in which the first and the second inputs CI1 and CI2, and the output CO of the signal combining means CM are coupled through resistors R to a common node. This implementation allows for the use of mutually equal relatively low ohmic input/output impedances of the circuitry coupled to the first and the second inputs CI1 and CI2. An input of a receiver REC being coupled in common with the input of the jamming receiver JR of the negative jamming signal feedback loop JR, RSG to the output CO of the signal combining means CM receives the input signal with only a strongly suppressed carrier modulated jamming signal.

FIG. 3 shows a block diagram of a second embodiment of an anti jamming system according to the invention using a zero IF Costas Loop receiver with automatic search tuning at the carrier frequency of a jamming signal and loop gain control. The zero IF Costas Loop receiver is implemented by including, in addition to the embodiment of FIG. 2, in the PLL a multiplier M3 having first and second inputs coupled to outputs of the loop filter LF and the synchronous demodulator SD, respectively, and an output coupled through the loop amplifier LA and the summer S to the control input of the VCO. The multiplier M3 compensates for phase reversals of the output signal of the phase detector PD at zero crossings of the envelope signal of the jamming signal. The zero IF Costas Loop receiver is therewith suited to receive jamming signals, which are FM or AM modulated on carriers and/or suppressed carriers. To secure proper phase reversal compensation at zero crossings of the envelope signal of the jamming signal, also at small phase error signals within the PLL, an amplifier limiter A/L is inserted between the first low pass filter LP1 and the multiplier M3.

The loop gain control signal generator LGC of the jamming signal replica generator RSG derives a gain control signal for the variable amplifier M1 from an RMS (Root Mean Square) or amplitude related value of the demodulated envelope signal of the jamming signal at the output of the synchronous demodulator SD. In the embodiment shown, an RMS detector is used, receiving said demodulated envelope signal from the synchronous demodulator SD through the first low pass filter LP1. An output of the RMS detector is coupled to amplification means A to form the gain control signal for the variable amplifier M1.

The amplification means A is to adjust the open loop gain of the negative jamming signal feedback loop JR, RSG through the variable amplifier M1 to a level sufficiently high for an effective suppression of the jamming signal in the signal combining means CM, i.e. substantially larger than unity.

To suppress jamming signals on unknown carrier frequencies, the anti jamming system of this FIG. 3 is provided with a search tuning system using a microprocessor uP and a controllable switch SW inserted in the signal path of the tunable negative jamming signal feedback loop JR, RSG, e.g. as shown between the synchronous modulator M2 and the second input CI2 of the signal combining means CM. An input of the microprocessor uP is coupled to an output of the first low pass filter LP1, a tuning control output through the summer S to the control input of the VCO and a switch control output to a control input of the switch SW. The method used in this search tuning system is more specifically described with reference to the flow chart of FIG. 4.

FIG. 4 shows a flow chart illustrating the steps executed by the microprocessor uP as used in the embodiment of FIG. 3, when searching for and tuning the jamming receiver JR to a jamming signal.

In step 1: switch SW is controlled to switch off and therewith deactivate the negative jamming feedback suppression;

In step 2: the RF frequency band is scanned to detect carrier frequencies of jamming signals exceeding above a predetermined threshold value;

In step 3: the so detected carrier frequencies are being stored;

In step 4: upon completion of the scanning operation, selecting the carrier frequency of the strongest jamming signal frequency not coinciding with the RF frequency of a wanted signal;

In step 5: supplying a tuning control signal to the VCO to tune the zero IF PLL jamming signal receiver at the carrier of the so selected jamming signal;

In step 6: controlling switch SW to switch on and therewith activate the negative jamming feedback suppression FIG. 5 shows a block diagram of an anti jamming system according to the invention being provided with a plurality of tunable negative jamming signal feedback loops JR1, LGC1, M11, M12 to JRi, LGCi, Mi1, Mi2 from the output CO of the signal combining means CM to its second input CI2 for suppressing a plurality of jamming signals. The microprocessor uP now executes a search and tuning method as shown in FIG. 6 for each of the tunable negative jamming signal feedback loops JR1, LGC1, M11, M12 to JRi, LGCi, Mi1, Mi2. Per each such tunable negative jamming signal feedback loop one jamming signal is suppressed. The number i can in principle be chosen to correspond to the number of jamming signals to be suppressed.

FIG. 6A shows a block diagram of an RF receiver using an anti jamming system CM, JR, RSG according to the invention in the RF signal path. In this embodiment, the signal combining means CM is constituted by a common node mutually interconnecting the antennae means ANT, the input of the jamming receiver JR, the output of the replica signal generator RSG and an RF input of an RF receiver REC. A jamming signal included in the RF antennae input signal is being suppressed in the negative jamming signal feedback loop resulting at the common node of the signal combining means CM in an RF input signal for the RF receiver, which is freed from said jamming signal.

FIG. 6B a block diagram of an RF receiver receiving an RF antennae signal from antennae means ANT being supplied through an RF input circuit RFI of an RF receiver to a mixer stage M. The mixer stage M is being provided with a local oscillator signal from a tunable oscillator TO to convert a wanted RF signal into an IF signal. The mixer stage M is followed by an IF filter IFF for a selection of said IF signal. The IF filter IFF is coupled to the first input CI1 of the signal combining means CM of a anti jamming system CM, JR, RSG according to the invention. The output CO of the compensation means CM is coupled to a demodulator DEM of the RF receiver, which is followed by a baseband signal processor SP. The RF receiver may be an FM and/or AM radio receiver, in which case the demodulator is an FM and/or AM demodulator and the baseband signal processor SP includes audio signal processing and reproduction means.

Now, the present invention has hereabove been disclosed with reference to preferred embodiments thereof. The invention may be applied in the RF, IF and/or AF or baseband signal paths of existing receivers and is suitable for implementation in digital or analogue form. If implemented in digital form, then the anti jamming system is to be preceded by an AD converter and all elements of the tunable negative jamming signal feedback loop, including the FLL jamming receiver JR, the replica jamming signal generator RSG and the signal combining means CM may be implemented by means of logic circuitry or other digital devices. Also, the jamming system according to the invention in applicable to a wide range of receiver categories, including not only FM and/or AM radio receivers and television receivers, but also to the receiver part of mobile telephones, in GPS receivers, in radar equipment, etcetera.

Persons skilled in the art will recognize that numerous modifications and changes may be made thereto without exceeding the scope of the appended Claims. Such modification may involve e.g. the use of a plurality of negative jamming signal feedback loops JR1, SRG1 to JRi, SRGi in the embodiment of FIG. 1 for suppressing a plurality of known jamming signals, i.e. without an automatic jamming signal search tuning, and/or the replacement of circuitry, such as the replacement of the RMS detector by an amplitude detector. Another modification may be applied to a microprocessor already present in the receivers of FIGS. 6A and 6B e.g. for searching alternative RDS frequencies, for the purpose of additionally searching jamming signals similar to the microprocessor uP of FIG. 3. In consequence, the embodiments should be considered as being illustrative, and no restriction should be construed from those embodiments, other than as have been recited in the Claims.

Throughout the specification, and in the claims, the term "coupled" means either a direct electrical connection between the things that are connected, or an indirect connection through one or more passive or active intermediary devices. The term "circuit" means one or more passive and/or active components that are arranged to cooperate through digital or analogue signals with one another to provide a desired function. The term "signal" means at least one current signal, voltage signal, electromagnetic wave signal, or data signal. The meaning of "a", "an", and "the" include plural references. The meaning of "in" includes "in" and "on".

The invention claimed is:

1. An anti jamming system comprising:
   a combiner that is configured to receive an input signal that includes a carrier modulated jamming signal, and a replica jamming signal, and to provide an output corresponding to a suppression of the carrier modulated jamming signal in the input signal,
   a jamming signal feedback loop that includes:
      a jamming signal receiver having a phase locked loop (PLL) that includes:
         a voltage controlled oscillator (VCO) that provides a in-phase and phase quadrature oscillator outputs,
         a synchronous demodulator having a signal input coupled to the output of the combiner, a carrier input coupled to the in-phase oscillator output, and an output,
         a phase detector having a signal input coupled to the output of the combiner, a carrier input coupled to the phase quadrature oscillator output, and an output,
         a loop filter and amplifier that are configured to receive the output of the phase detector and to produce a phase control signal for controlling the VCO; and
      a jamming signal replica generator that includes a modulator having a signal input that is coupled to the output of the synchronous demodulator and a carrier input that is coupled to the in-phase oscillator output of the VCO, and an output that provides the replica jamming signal.

2. The anti jamming system of claim 1, wherein the replica jamming signal is opposite in phase to the carrier modulated jamming signal, and the combiner includes an adder that is configured to add the input signal and the replica jamming signal to provide the suppression of the carrier modulated jamming signal in the input signal.

3. The anti jamming system of claim 1, wherein the PLL includes a multiplier with first and second inputs coupled to outputs of the loop filter and the synchronous demodulator, respectively, for phase reversing the phase control signal in the PLL at zero crossings of an envelope signal of the jamming signal, an output of the multiplier being coupled to the VCO.

4. The anti jamming system of claim 3, including a first low pass filter coupled between the synchronous demodulator and the modulator.

5. The anti jamming system of claim 3, including a second low pass filter coupled between the synchronous demodulator and the multiplier.

6. The anti jamming system of claim 5, including an amplifier limiter coupled between the second low pass filter and the multiplier and having a tanh transfer characteristic between upper and lower signal limiting values.

7. The anti jamming system of claim 1, including an amplifier that provides an open loop gain of the jamming signal feedback loop that is substantially larger than unity.

8. The anti jamming system of claim 1, including a tuning control signal generator that is configured to derive a tuning control signal from predetermined tuning data defining the carrier frequency of the jamming signal.

9. The anti jamming system of claim 1, including other jamming signal feedback loops, each being tuned to a carrier frequency of other respective jamming signals.

10. The anti jamming system of claim 1, including a processor that is configured to:
   deactivate the suppression of the carrier modulated jamming signal in the input signal;
   scan an RF frequency band to detect carrier frequencies of jamming signals above a predetermined threshold value;
   store the detected carrier frequencies;
   select the carrier frequency of a strongest jamming signal frequency that does not coincide with an RF frequency of a wanted signal;
   supply a tuning control signal to the VCO to tune the jamming signal receiver at the selected carrier frequency; and
   activate the suppression of the carrier modulated jamming signal in the input signal.

11. A receiving system comprising:
   a receiver that is configured to receive an input signal and produce therefrom a baseband signal,
   an anti jamming system that includes:
      a combiner that is configured to receive a carrier modulated jamming signal within the input signal and a replica jamming system to provide an output corresponding to a suppression of the carrier modulated jamming signal,
      a jamming signal receiver having a phase locked loop (PLL) that includes:
         a voltage controlled oscillator (VCO),
         a synchronous demodulator, coupled to the VCO, that is configured to receive the output of the combiner and provide a demodulated output,
         a phase detector, coupled to the VCO, that is configured to receive the output of the combiner and provide a phase output,
         a loop filter and amplifier that are configured to receive the phase output and produce a phase control signal for controlling the VCO; and
      a jamming signal replica generator that includes a modulator that is coupled to the VCO and configured to receive the demodulated output and provide the replica jamming signal.

12. The receiving system of claim 11, wherein the combiner is configured to be placed in an RF stage of the receiving system.

13. The receiving system of claim 11, wherein the combiner is configured to be placed in an IF stage of the receiving system.

14. The receiving system of claim 11, wherein the combiner is configured to be placed in a baseband stage of the receiving system.

15. The receiving system of claim 11, wherein the PLL includes a multiplier with first and second inputs coupled to outputs of the loop filter and the synchronous demodulator, respectively, for phase reversing the phase control signal in the PLL at zero crossings of an envelope signal of the jamming signal, an output of the multiplier being coupled to the VCO.

16. The receiving system of claim 15, including a first low pass filter coupled between the synchronous demodulator and the modulator.

17. The receiving system of claim 15, including a second low pass filter coupled between the synchronous demodulator and the multiplier.

18. The receiving system of claim 11, including a tuning control signal generator that is configured to derive a tuning control signal from predetermined tuning data defining the carrier frequency of the jamming signal.

19. The receiving system of claim 11, including a processor that is configured to interrupt the replica jamming signal to:
   allow a frequency band to be monitored for detecting one or more other carrier frequencies of other jamming signals,
   deactivate the suppression of the carrier modulated jamming signal in the input signal;
   detect carrier frequencies of jamming signals above a predetermined threshold value;
   select the carrier frequency of a strongest jamming signal frequency that does not coincide with an RF frequency of a wanted signal;
   supply a tuning control signal to the VCO to tune the jamming signal receiver at the selected carrier frequency; and
   activate the suppression of the carrier modulated jamming signal in the input signal.

* * * * *